United States Patent
Sengupta

(10) Patent No.: US 6,402,818 B1
(45) Date of Patent: Jun. 11, 2002

(54) DEGASSING A LIQUID WITH A MEMBRANE CONTACTOR

(75) Inventor: Amitava Sengupta, Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/586,369

(22) Filed: Jun. 2, 2000

(51) Int. Cl.$^7$ .......................... B01D 19/00; B01D 53/22
(52) U.S. Cl. ............................ 96/6; 95/46; 96/8; 96/14
(58) Field of Search .................. 95/46; 96/6, 8, 96/10, 14

(56) References Cited

U.S. PATENT DOCUMENTS

| | | | | |
|---|---|---|---|---|
| 4,220,535 A | * | 9/1980 | Leonard ....................... | 96/6 X |
| 4,666,469 A | * | 5/1987 | Krueger et al. .............. | 96/8 X |
| 4,707,267 A | * | 11/1987 | Johnson ........................ | 96/8 X |
| 4,752,305 A | * | 6/1988 | Johnson ........................ | 96/8 X |
| 5,264,171 A | * | 11/1993 | Prasad et al. ................ | 264/103 |
| 5,470,469 A | * | 11/1995 | Eckman ........................ | 96/8 X |
| 5,696,545 A | * | 12/1997 | Cho et al. ..................... | 95/46 |
| 5,830,261 A | * | 11/1998 | Hamasaki et al. ............ | 96/6 |
| 5,938,922 A | | 8/1999 | Fulk, Jr. et al. ........ | 210/321.81 |
| 6,168,648 B1 | * | 1/2001 | Ootani et al. ................. | 95/46 |
| 6,210,464 B1 | * | 4/2001 | Nakanishi et al. ........... | 96/8 X |
| 6,228,146 B1 | * | 5/2001 | Kuespert ....................... | 95/46 |

FOREIGN PATENT DOCUMENTS

| | | | | |
|---|---|---|---|---|
| JP | 2725311 | | 4/1990 | |
| JP | 03-278805 A | * | 12/1991 | .................... 96/6 |
| JP | 06-015254 A | * | 1/1994 | .................... 96/6 |
| JP | 2743419 | | 4/1998 | |
| JP | 2949732 | | 9/1999 | |

* cited by examiner

Primary Examiner—Robert H. Spitzer
(74) Attorney, Agent, or Firm—Robert H. Hammer, III

(57) ABSTRACT

A membrane contactor degasses a liquid. A liquid having a dissolved gas is introduced into a contactor which is connected to a vacuum source. The contactor has a perforated core, a plurality of hollow fiber membranes, a tube sheet affixing each end of the fibers, and a shell having a liquid egress. The shell encloses the fibers, the tube sheet, and the core. The hollow fiber lumens are in fluid communication with the vacuum source. Liquid enters the contactor via the core's open end radially exits the core, crosses over the membranes within the shell, and exits the contactor by the liquid egress. The dissolved gas thereby diffuses from the liquid across the membrane into the lumen. The liquid exiting may have a dissolved gas content to less than 1 ppb.

6 Claims, 2 Drawing Sheets

DEGASSING A LIQUID WITH A MEMBRANE CONTACTOR

FIELD OF THE INVENTION

The instant invention is directed to degassing a liquid using a membrane contactor.

BACKGROUND OF THE INVENTION

The use of membrane contactors for degassing of liquid is known. See, for example, U.S. Pat. No. 5,938,922; Japanese Patent Nos. 2,725,311, 2,743,419, and 2,949,732; and commercially available products traded under the name of Separel® hollow fiber membrane degassing modules from Dainippon Ink and Chemicals, Inc. of Tokyo, Japan, and Liqui-Cel® membrane contactors from Celgard Inc. of Charlotte, N.C.

U.S. Pat. No. 5,938,922 discloses a contactor with a baffle to direct liquid flow in a specific path. Note FIG. 2 of U.S. Pat. No. 5,938,922, liquid passes radially from the core, over the membranes (where gas is diffused into the lumen), around the baffle in longitudinal direction, radially inward to the core, and exits the contactor via the core. Vacuum is drawn on the lumen side of the polypropylene homogeneous microporous hollow fiber membrane, and liquid is introduced within the shell of the contactor via the perforated core. While this contactor is capable of obtaining less than 1 ppb of dissolved gas at the pressure range of 15 to 20 torr, it is difficult to manufacture.

Japanese Patent No. 2,725,311 discloses a contactor for degassing liquids with a non-homogeneous hollow fiber membrane made from poly(4-methylpentene-1) or PMP. Non-homogeneous membranes are distinguished from porous membranes (e.g. microporous membranes).

Japanese Patent No. 2,743,419 discloses a contactor for degassing a liquid which is able to discharge a liquid with less than 300 ppb dissolved gas, but the liquid temperature must be elevated to about 40 to 80° C., and the vacuum level is at 30 to 100 torr.

Japanese Patent No. 2,949,732 discloses a contactor for degassing using a non-homogeneous PMP hollow fiber membrane and a sweep gas or a combination of vacuum and sweep gas. Liquids can be degassed to around 500 ppb at flow rates of 7 to 8.3 liters per minute (lpm) and at vacuum pressures in the range of 28 to 38 torr.

Separel® EF 040P from Dianippon Ink and Chemical Inc. of Tokyo, Japan uses the skinned (non-communicating pore) PMP membrane mentioned above, has a radial flow pattern with a shell egress, and reports dissolved gas levels below 1 ppb but only at low flow rates ($\leq$20 liters per minute) with 40 m$^2$ membrane area. At greater flow rates (33–57 lpm), dissolved gas levels range from 18–96 ppb.

Membrane contactors are useful in the following commercial applications: feeding oxygen for cultivating enzymes and microbes in medicine and foodstuff production; feeding oxygen in waste water treatment systems; oxidizing broths with air or ozone in chemical and pharmaceutical unit operations; feeding oxygen in fish breeding and transportation industries; feeding oxygen to culture solutions in hydroponic farming; preparing water having high oxygen contents for manufacturing face treating liquids and health beverages; eliminating one or more kinds of components contained in gases by dissolution into liquids (e.g. $SO_x$, $NO_x$, $H_2S$, etc.), in waste gas cleaning and eliminating $CO_2$ from fermented methane gas; degassing liquids, e.g. deoxidizing water fed to boilers and liquids fed to reverse osmosis membranes, to produce super-pure water for semiconductor rinsing, deoxidizing water and seawater for mist prevention of pipes and refrigerators, to eliminate $CO_2$ from biological cultures, to eliminate organic solvent from waste water; and to simultaneously dissolve and eliminate gases from liquid.

In the area of high purity water for rinsing semiconductors, as the semi-conductors become more complex, the need for greater purity water (e.g. <1 ppb dissolved oxygen) becomes greater.

SUMMARY OF THE INVENTION

The present invention is directed to degassing a liquid with a membrane contactor. A liquid having a dissolved gas is introduced into a contactor which is connected to a vacuum source. The contactor has a perforated core, a plurality of hollow fiber membranes, a tube sheet affixing each end of said fibers, and a shell having a liquid egress. The shell encloses the fibers, the tube sheet, and the core. The hollow fiber lumens are in fluid communication with the vacuum source. Liquid enters the contactor via the core's open end radially exits the core, crosses over the membranes within the shell, and exits the contactor by the liquid egress. The dissolved gas thereby diffuses from the liquid across the membrane into the lumen. The liquid exiting may have a dissolved gas content to less than 1 ppb.

DETAILED DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
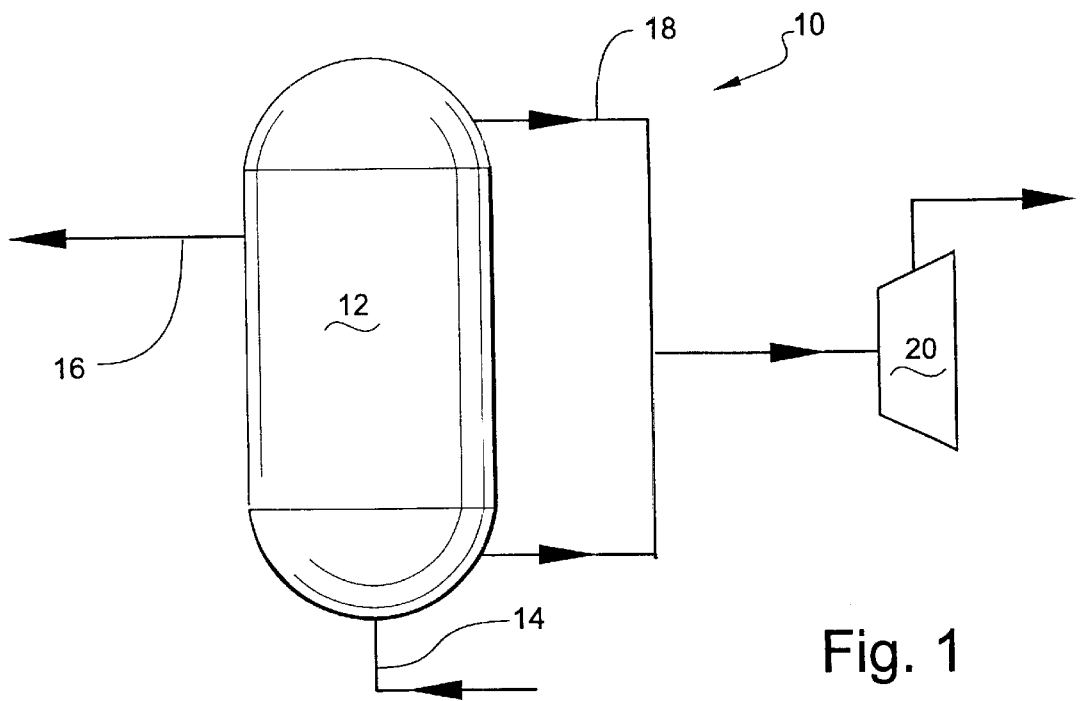
FIG. 1 is a schematic illustration showing a system for degassing a liquid.

Referring to the drawings wherein like numerals indicate like elements, there is shown in FIG. 1 a schematic illustration of degassing system 10.

System 10 comprises, in major elements, a contactor 12 and a vacuum pump 20. Contactor 12, which will be described in greater detail below, has a port 14 for the introduction of liquid containing the dissolved gas and an egress 16 for the discharge of the degassed liquid. Contactor 12 is coupled, for fluid communication, with the vacuum pump 20 via vacuum lines 18. Vacuum pump 20 is preferably a water seal type vacuum pump, for ease of operation, capable of delivering vacuum down to 15 torr and preferably in the range of 15 to 30 torr.

Figure 2:
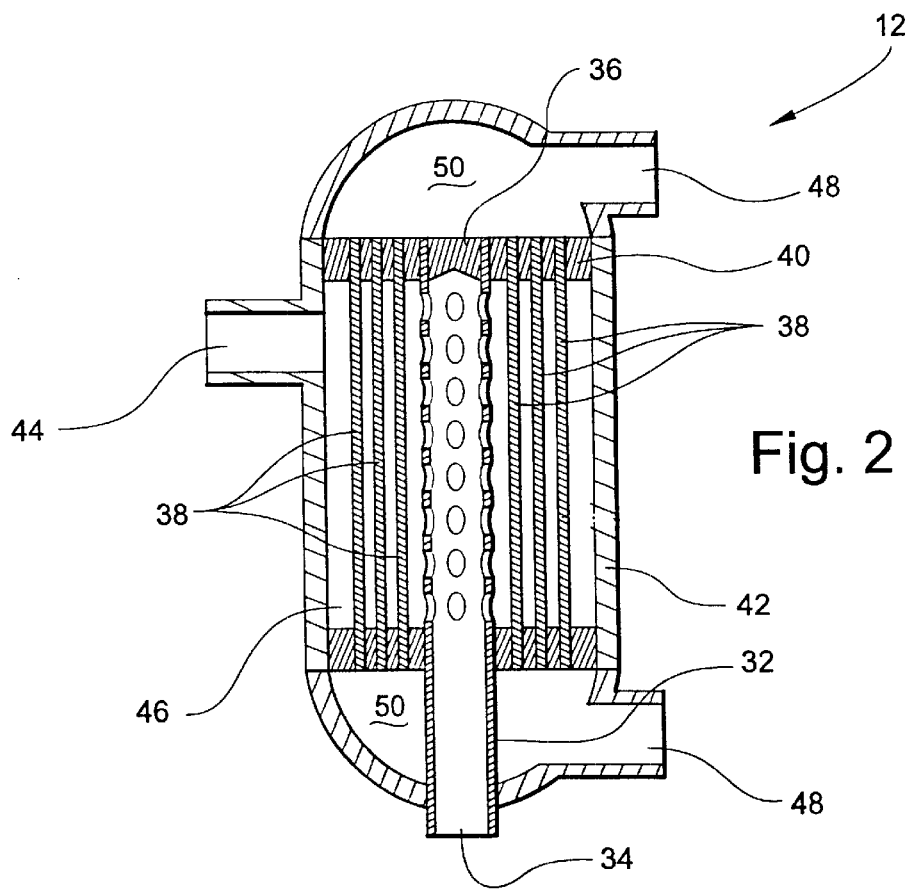
FIG. 2 is a sectional view of the first embodiment of the inventive contactor.

Referring to FIG. 2, a first embodiment of contactor 12 is illustrated. Contactor 12 includes a perforated core 32. Core 32 has an open end 34 (corresponding to port 14) and closed end 36. A plurality of hollow fiber membranes 38 surround core 32. Each hollow fiber membrane 38 (described in greater detail below) has a lumen. The ends of the hollow fibers are potted in place to form tube sheet 40. Shell 42 surrounds the hollow fiber membranes 38, the perforated core 32, and the tube sheets 40. A shell egress 44 (corresponding to egress 16) is disposed in the shell 42.

Shell space 46 is in fluid communication with the open end 34 of core 32, so that liquid may pass from the core radially out therefrom, cross over the exterior surface of the hollow fiber membranes 38, and is discharged from egress 44. The ends of contactor 12 are fitted with vacuum ports 48 (corresponding to vacuum line 18) which are in communication with a head space 50. The lumens of the hollow fibers are in communication with the head space 50 so that vacuum is provided to the lumens.

In operation, a liquid containing a dissolved gas (e.g. 10–9000 ppb), preferably at ambient temperatures (e.g. 20–30° C.) is introduced (e.g. minimum flow rate of 20 liters per minute or lpm, preferably in the range of 20–100 lpm) into the contactor 12 via open end 34 of core 32. The liquid source is not limited, typically, tap water has a dissolved gas content in the range of 550–9000 ppb, and liquid that has been degassed, for example in a vacuum tower, may have a dissolved gas content as low as 10 ppb. The liquid is distributed from the perforated core 32 and flows radially outward from the core and across hollow fiber membranes 38. As the liquid containing gas crosses over the exterior surface of the hollow fibers 38, dissolved gas is diffused from the liquid and across the fiber wall into the lumen of the hollow fiber motivated by the vacuum (15–30 torr) on the lumen side of the fiber. The dissolved gas is then discharged through the head space 50 and out of vacuum ports 48. Degassed water (preferably <1 ppb) is discharged through egress 44. Further preferred operating characteristics are set out in Table 1.

TABLE 1

| Membrane Area ($m^2$) | Liquid Temp. (° C.) | Liquid Flow Rate (lpm) | Vacuum[1] (torr) | $DO^2$ Inlet (ppb) | $DO^2$ Outlet (ppb) |
| --- | --- | --- | --- | --- | --- |
| 130 | 25 | 57 | 22 | 8114 | 0.6 |
| 130 | 20 | 38 | 17 | 8915 | 0.2 |
| 130 | 30 | 76 | 28 | 7662 | 0.9 |

[1]Vacuum source - SIHI, model LPH 3704, with 5 hp motor @ 1750 rpm. Capacity @ 25 torr = 17.0 ACFM with 16° C. service water. Capacity (estimated) @ 22 torr = 12 ACFM with 5° C. service water.
[2]DO refers to "dissolved oxygen."

A plurality of hollow fiber membranes should include sufficient membrane so that there is more than 40 $m^2$ of membrane surface area and preferably greater than 50 $m^2$ of area and most preferably greater than 100 $m^2$. The hollow fiber membranes 38 are selected from the group of porous membranes, homogeneous membranes, and asymmetric membranes (asymmetric membranes include membranes with pores communicating from one surface to the other, but excludes membranes without communicating pores). Polymer selection for the membrane is not limited except that such polymer must be capable of forming the foregoing types of membranes, as is known in the art. See: Kesting, R. E., *Synthetic Polymeric Membranes*, 2ed, John Wiley & Sons, Inc., NYC, N.Y. (1985), incorporated herein by reference. Preferred membranes are made from polyolefins, most preferably polypropylene, and are microporous. Membranes preferably have: a porosity of about 20–50%, a pore size (at one surface) of about 0.02–0.07 microns, a Gurley (per 10 cc) of 15–200 sec, and a membrane wall thickness of about 15–75 microns. The most preferred membrane has a porosity of about 25%, a pore size of about 0.02 microns, a Gurley of about 190 sec, and a wall thickness of about 50 microns. For example, such membranes are commercially available under the tradename Celgard® membranes from Celgard Inc. of Charlotte, N.C.

Figure 3:
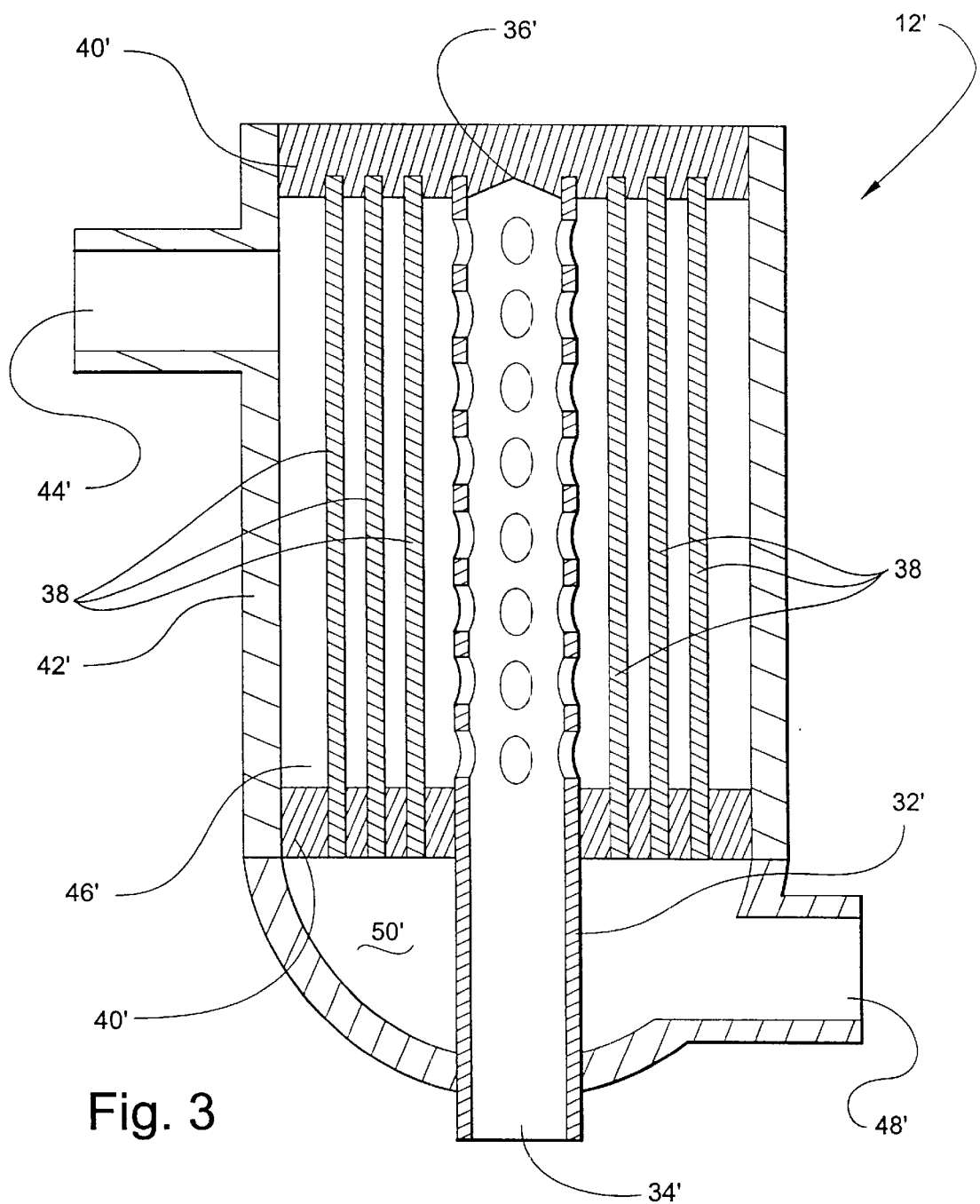
FIG. 3 is a sectional view of a second embodiment of the inventive contactor.

Referring to FIG. 3, a second embodiment of contactor 12' is shown. Contactor 12' includes a perforated core 32'. Core 32' has an open end 34' and a closed end 36'. A plurality of hollow fiber membranes 38 surround core 32'. The ends of the membranes 38 are potted in place to form tube sheets 40'. The ends of the hollow fibers 38 in the tube sheet 40' at end 36' are closed. Shell 42' surrounds the hollow fiber membranes 38, the perforated core 32', and tube sheet 40'. Shell space 46' is in fluid communication with the open end 34', so that liquid may pass from the core radially out therefrom, cross over the exterior surface of the hollow fiber membranes 38, and is discharged from egress 44'. Only one end of contactor 12' is fitted with a vacuum port 48' which is in communication with the head space 50', so that vacuum is provided to the lumens.

The present invention may be embodied in other specific forms without departing from the spirit or essential attributes thereof and, accordingly, reference should be made to the appended claims, rather than to the foregoing specification, as indicating the scope of the invention.

What is claimed is:

1. A contactor for degassing a liquid comprising:
   a perforated core having an open end and a closed end;
   a plurality of hollow fiber membranes, each said fiber having a lumen, said fibers surrounding said core, each said fiber having two ends;
   a tube sheet affixing each said fiber end; and
   a shell having a liquid egress, said shell enclosing said fibers, said tube sheets, and said core;
   whereby said lumens being adapted for communication via said fiber end with a vacuum source;
   said core being adapted for radially distributing a liquid containing a dissolved gas transversely across said fibers so that the dissolved gas shall diffuse into said fibers;
   said egress being adapted for discharging the liquid from the contactor with <1 ppb dissolved gas; and
   the contactor being adapted for a minimum liquid flow rate of 20 liters per minute.

2. The contactor according to claim 1 further comprising said membranes having a pore size of 0.02–0.07 microns, and a membrane wall thickness of 15–75 microns.

3. A system for degassing a liquid comprising:
   a liquid having a dissolved gas, said liquid having a temperature in the range of about 20 to 30° C., a flow rate greater than or equal to 20 liters per minute;
   a source of vacuum, said vacuum source being capable of delivering vacuum down to 15 torr;
   a contactor having
      a perforated core having an open end and a closed end,
      a plurality of hollow fiber membranes, each said fiber having a lumen, said fibers surrounding said core, said fibers having two ends,
      a tube sheet affixing each said fiber end, and
      a shell having a liquid egress, said shell enclosing said fibers, said tube sheet, and said core;
   whereby said hollow fiber lumens being in fluid communication with said vacuum source, and said liquid having a dissolved gas entering said contactor via said core's open end, radially exiting said core, crossing over said fibers within said shell, and exiting said contactor via said shell's liquid egress, so that said dissolved gas may diffuse from said liquid across said fiber into said lumen and said liquid exiting said egress having a dissolved gas content of less than or equal to <1 ppb.

4. The system according to claim 3 wherein said flow rate being between 20 and 100 liters per minute.

5. A system for degassing a liquid comprising:
a liquid having a dissolved gas, said liquid having a temperature in the range of about 20 to 30° C., a flow rate greater than or equal to 20 liters per minute, and a dissolved gas content in the range of 5500 to 9000 ppb;
a source of vacuum, said vacuum source in the range of about 15 to 30 torr;
a contactor having
a perforated core having an open end and a closed end,
a plurality of hollow fiber membranes having communicating pores, said membrane being selected from the group consisting of porous membranes, homogeneous membranes, and asymmetric membranes (composite membranes), each said fiber having a lumen, said fibers surrounding said core, said fibers having two ends,
a tube sheet affixing each said fiber end, and
a shell having a liquid egress, said shell enclosing said fibers, said tube sheet, and said core;
whereby said hollow fiber lumens being in fluid communication with said vacuum source, and said liquid having a dissolved gas entering said contactor via said core's open end, radially exiting said core, crossing over said fibers within said shell, and exiting said contactor via said shell's liquid egress, so that said dissolved gas may diffuse from said liquid across said fiber into said lumen.

6. A system for degassing a liquid comprising:
a liquid having a dissolved gas, said liquid having a temperature in the range of about 20 to 30° C., a flow rate greater than or equal to 20 liters per minute, and a dissolved gas content in the range of 5500 to 9000 ppb;
a source of vacuum, said vacuum source in the range of about 15 to 30 torr;
a contactor having
a perforated core having an open end and a closed end,
a plurality of microporous hollow fibers, each said fiber having a lumen, said fibers surrounding said core, said fibers having two ends,
a tube sheet affixing each said fiber end, and
a shell having a liquid egress, said shell enclosing said fibers, said tube sheet, and said core;
whereby said hollow fiber lumens being in fluid communication with said vacuum source, and said liquid having a dissolved gas entering said contactor via said core's open end, radially exiting said core, crossing over said fibers within said shell, and exiting said contactor via said shell's liquid egress, so that said dissolved gas may diffuse from said liquid across said fiber into said lumen and said liquid exiting said egress having a dissolved gas content of less than or equal to 1 ppb.

* * * * *